(12) United States Patent
Cai

(10) Patent No.: US 11,699,130 B2
(45) Date of Patent: Jul. 11, 2023

(54) METHOD, SYSTEM AND DEVICE OF ACCUMULATING ORDER-GOODS, AND ELECTRONIC APPARATUS

(71) Applicants:Beijing JingDong ShangKe Information Technology Co., Ltd., Beijing (CN); Beijing Jingdong Century Trading Co., Ltd., Beijing (CN)

(72) Inventor: Xiaoming Cai, Beijing (CN)

(73) Assignees: Beijing JingDong ShangKe Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 75 days.

(21) Appl. No.: 17/281,145

(22) PCT Filed: Jul. 19, 2019

(86) PCT No.: PCT/CN2019/096719
§ 371 (c)(1),
(2) Date: Mar. 29, 2021

(87) PCT Pub. No.: WO2020/063063
PCT Pub. Date: Apr. 2, 2020

(65) Prior Publication Data
US 2021/0357849 A1 Nov. 18, 2021

(30) Foreign Application Priority Data
Sep. 29, 2018 (CN) .......................... 201811155383.4

(51) Int. Cl.
*G06Q 10/087* (2023.01)
*G06Q 10/083* (2023.01)

(52) U.S. Cl.
CPC ......... *G06Q 10/087* (2013.01); *G06Q 10/083* (2013.01)

(58) Field of Classification Search
None
See application file for complete search history.

(56) References Cited

U.S. PATENT DOCUMENTS

| 4,656,591 | A | * | 4/1987 | Goldberg | ............... | G06Q 10/08 |
| | | | | | | 700/226 |
| 4,688,678 | A | * | 8/1987 | Zue | ........................ | B07C 3/082 |
| | | | | | | 209/900 |

(Continued)

FOREIGN PATENT DOCUMENTS

| CN | 106040597 | 10/2016 |
| CN | 106540883 | 3/2017 |

(Continued)

OTHER PUBLICATIONS

International Search Report and Written Opinion, issued in the corresponding PCT application No. PCT/CN2019/096719, dated Sep. 27, 2019, 8 pages.

*Primary Examiner* — Nathan A Mitchell
*Assistant Examiner* — Kimberly S. Bursum
(74) *Attorney, Agent, or Firm* — Hamre, Schumann, Mueller & Larson, P.C.

(57) ABSTRACT

The present disclosure provides a method of accumulating order-goods, including: acquiring a collection order queue; acquiring a collection order from the collection order queue, assigning a first slide to the collection order, and sending goods in the collection order to the first slide in response to a presence of a first slide in an idle state, wherein the first slide only allows sending of goods in one collection order at one time; and activating a second slide in response to a predetermined condition being satisfied, wherein the second slide allows simultaneous sending of goods in a plurality of (Continued)

collection orders. The present disclosure further provides a system of accumulating order-goods, an electronic apparatus, a computer-readable storage medium, and a device of accumulating order-goods.

6 Claims, 3 Drawing Sheets

(56) References Cited

U.S. PATENT DOCUMENTS

| | | | | |
|---|---|---|---|---|
| 7,031,801 | B1* | 4/2006 | Hodge | B65G 1/137 |
| | | | | 700/216 |
| 9,751,693 | B1* | 9/2017 | Battles | B25J 9/0084 |
| 2014/0214234 | A1* | 7/2014 | Worsley | G06Q 10/087 |
| | | | | 701/2 |
| 2015/0151913 | A1* | 6/2015 | Wong | G05B 15/02 |
| | | | | 700/214 |
| 2016/0086255 | A1* | 3/2016 | Sainfort | G06Q 30/0613 |
| | | | | 705/26.82 |
| 2018/0071786 | A1* | 3/2018 | Robbins | B07C 5/00 |
| 2018/0137459 | A1* | 5/2018 | Jacobs | G06Q 10/087 |
| 2019/0060959 | A1* | 2/2019 | Imazu | B65G 11/203 |

FOREIGN PATENT DOCUMENTS

| | | |
|---|---|---|
| CN | 106809586 | 6/2017 |
| CN | 106980949 | 7/2017 |
| CN | 108320041 | 7/2018 |

* cited by examiner

METHOD, SYSTEM AND DEVICE OF ACCUMULATING ORDER-GOODS, AND ELECTRONIC APPARATUS

CROSS-REFERENCE TO RELATED APPLICATION

This application is a Section 371 National Stage Application of International Application No. PCT/CN2019/096719, filed on Jul. 19, 2019, entitled "METHOD, SYSTEM AND DEVICE OF ACCUMULATING ORDER-GOODS, AND ELECTRONIC APPARATUS" which claims priority to Chinese Application No. 201811155383.4, filed on Sep. 29, 2018, incorporated herein by reference in their entirety.

TECHNICAL FIELD

The present disclosure relates to the technical field of warehousing and logistics, and in particular to a method, a system and device of accumulating order-goods and an electronic apparatus.

BACKGROUND

With a development of information technology, an e-commerce mode has developed rapidly because it caters to people's needs for convenience. At present, after receiving an order, an e-commerce company needs to pick and pack goods in the order and deliver the goods to a user as soon as possible through logistics. Users have gradually improved requirements on effectiveness of e-commerce services. Therefore, how to further improve an order processing efficiency has become an urgent problem to be solved.

SUMMARY

In view of this, the present disclosure provides a method, a system and a device of accumulating order-goods, and an electronic apparatus.

One aspect of the present disclosure provides a method of accumulating order-goods, including: acquiring a collection order queue; acquiring a collection order from the collection order queue, assigning a first slide to the collection order, and sending goods in the collection order to the first slide in response to a presence of the first slide in an idle state, wherein the first slide only allows sending of the goods in one collection order at one time; and activating a second slide in response to a predetermined condition being satisfied, wherein the second slide allows simultaneous sending of the goods in a plurality of collection orders.

According to the embodiments of the present disclosure, the activating a second slide in response to a predetermined condition being satisfied includes activating the second slide in response to an absence of the first slide in an idle state.

According to the embodiments of the present disclosure, the activating a second slide in response to a predetermined condition being satisfied includes activating the second slide in response to a number of the collection orders in the collection order queue being greater than a predetermined value.

According to the embodiments of the present disclosure, the method further includes: in response to the goods in one same collection order including goods of a specific type, sending other goods in the collection order to the first slide or the second slide prior to the goods of the specific type.

Another aspect of the present disclosure provides a system of accumulating order-goods, including: an acquisition module configured to acquire a collection order queue; a first processing module configured to acquire a collection order from the collection order queue, assign a first slide to the collection order, and send goods in the collection order to the first slide in response to a presence of the first slide in an idle state, wherein the first slide only allows sending of the goods in one collection order at one time; and a second processing module configured to activate a second slide in response to a predetermined condition being satisfied, wherein the second slide allows simultaneous sending of the goods in a plurality of collection orders.

According to the embodiments of the present disclosure, the activating a second slide in response to a predetermined condition being satisfied includes activating the second slide in response to an absence of the first slide in an idle state.

According to the embodiments of the present disclosure, the activating a second slide in response to a predetermined condition being satisfied includes activating the second slide in response to a number of the collection orders in the collection order queue being greater than a predetermined value.

According to the embodiments of the present disclosure, the system further includes an adjustment module configured to, in response to the goods in one collection order including goods of a specific type, send other goods in the collection order to the first slide or the second slide prior to the goods of the specific type.

Another aspect of the present disclosure provides an electronic apparatus, including: at least one processor, and at least one memory for storing one or more computer-readable instructions, wherein in response to the one or more computer-readable instructions being executed by the at least one processor, the at least one processor implements the method described above.

Another aspect of the present disclosure provides a computer-readable storage medium having computer-executable instructions stored thereon, wherein the instructions are used to implement the method described above when being executed.

Another aspect of the present disclosure provides a computer program including computer-executable instructions, wherein the instructions are used to implement the method described above when being executed.

Another aspect of the present disclosure provides a device of accumulating order-goods, including: a plurality of first slides each configured to allow sending of goods in one collection order at one time; at least one second slide configured to allow simultaneous sending of goods in a plurality of collection orders; a suspension chain configured to suspend the goods and send the goods to the first slide or the second slide according to the collection order; and a controller configured to acquire a collection order queue, acquire the collection order from the collection order queue, assign the first slide to the collection order, send goods in the collection order to the first slide in response to a presence of the first slide in an idle state, and activate the second slide in response to a predetermined condition being satisfied.

According to the embodiments of the present disclosure, the device further includes an indicator light configured to indicate a working state of the first slide or the second slide.

BRIEF DESCRIPTION OF THE DRAWINGS

The above and other objectives, features and advantages of the present disclosure will be more apparent through the following description of embodiments of the present disclosure with reference to the drawings.

DETAILED DESCRIPTION OF EMBODIMENTS

Figure 1:
FIG. 1 schematically shows an application scenario of a method of accumulating order-goods according to the embodiments of the present disclosure.

Embodiments of the present disclosure will be described below with reference to the drawings. It should be understood, however, that these descriptions are merely exemplary and are not intended to limit the scope of the present disclosure. In the following detailed description, for ease of interpretation, many specific details are set forth to provide a comprehensive understanding of the embodiments of the present disclosure. However, it is clear that one or more embodiments may also be implemented without these specific details. In addition, in the following description, descriptions of well-known structures and technologies are omitted to avoid unnecessarily obscuring the concept of the present disclosure.

The terms used herein are for the purpose of describing specific embodiments only and are not intended to limit the present disclosure. The terms "comprising", "including", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In the case of using the expression similar to "at least one of A, B and C, etc.", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C, and so on). In the case of using the expression similar to "at least one of A, B or C, etc.", it should be explained according to the meaning of the expression generally understood by those skilled in the art (for example, "a system having at least one of A, B or C" should include but not be limited to a system having only A, a system having only B, a system having only C, a system having A and B, a system having A and C, a system having B and C, and/or a system having A, B and C, and so on). Those skilled in the art should also understand that any transitional conjunction and/or phrase essentially representing two or more optional items, whether in the description, claims or drawings, should be understood to give a possibility of including one, either or both of the items. For example, the phrase "A or B" should be understood to give a possibility of including "A" or "B", or "A and B."

The embodiments of the present disclosure provide a method for managing items, including: acquiring identification information of an item, determining first user information of an owner of the item based on the identification information; acquiring second user information of a current user, and allowing the current user to obtain the item based on an authorization of the owner to the current user in response to the second user information inconsistent with the first user information.

FIG. 1 schematically shows an application scenario of a method of accumulating order-goods according to the embodiments of the present disclosure. It should be noted that FIG. 1 only shows an example of the application scenario in which the embodiments of the present disclosure may be applied so as to help those skilled in the art understand technical contents of the present disclosure. However, it does not mean that the embodiments of the present disclosure may not be used for other apparatuses, systems, environments or scenarios.

As shown in FIG. 1, an order production process refers to a process from acquiring orders to packaging goods corresponding to each order. This process mainly includes each step of S110 to S160 as shown in FIG. 1.

In S110, orders are acquired.

In S120, a collection order is generated based on the orders. Before picking goods ordered by customers, rationally processing the orders in batches to form a collection order and completing the collection order in a single picking process, this may significantly save picking time, improve an efficiency of picking the goods, and reduce a picking cost in a logistics center. For example, at first, the goods corresponding to a certain number of orders may be classified based on physical locations, the orders corresponding to the goods in a local area may be accumulated together to form an initial center point based on a single picking position. Then, an expansion is started from the center point position to positions around the center point position in sequence, until a number of the orders satisfying the collection order is selected. The above is only an exemplary description, and the method of the embodiments of the present disclosure does not limit a manner of determining the collection order.

In S130, a picking order is generated based on the collection order. For one collection order, one or more pickers or picking robots may complete a picking of the collection order. According to dimensions of the pickers or picking robots, the collection order may be separated into one or more picking orders. Each picker or picking robot corresponds to one picking order and is responsible for picking tasks on the picking order.

In S140, the goods are picked according to the picking order.

In S150, the picked goods are accumulated according to the collection order. Since picking work of a plurality of collection orders may be performed simultaneously during one same period, after each picking task corresponding to the collection order is completed, the goods of the same collection order need to be processed collectively, that is, the goods of different collection orders are separated according to the collection orders to form a collection of the goods corresponding to each collection order.

In S160, the goods are packaged according to the orders. After determining the goods corresponding to the collection order, the goods are respectively packaged according to an order granularity to complete the order production process.

In the above order production process, the method of the embodiments of the present disclosure is applied to the steps of S140 and S150, especially the step of S150. The following further describes an implementation of S140 and S150 in the embodiments of the present disclosure.

After the picking order is generated by a warehousing and logistics control system, it may be displayed to the picker in any way or sent to the picking robot. According to the picking tasks in the picking order, the picker or picking robot removes required goods from the warehouse shelves and hang them on a suspension chain. A suspension chain apparatus may acquire information of each suspended goods by scanning codes and other means. Combined with the control system, the goods of different collection orders may be sent to different slide ports and stacked at exits of different slides to realize an accumulation of the picked goods according to the collection orders.

In this process, since one slide may only be used to accumulate the goods in one collection order for a period of time, in response to a number of the collection orders that need to be simultaneously picked increasing, and in response to a number of the slides being insufficient, the entire order production process may be congested.

The method and system provided by the embodiments of the present disclosure may at least partially alleviate the problems described above. The method of the embodiments of the present disclosure will be described below with reference to FIG. 2.

Figure 2:
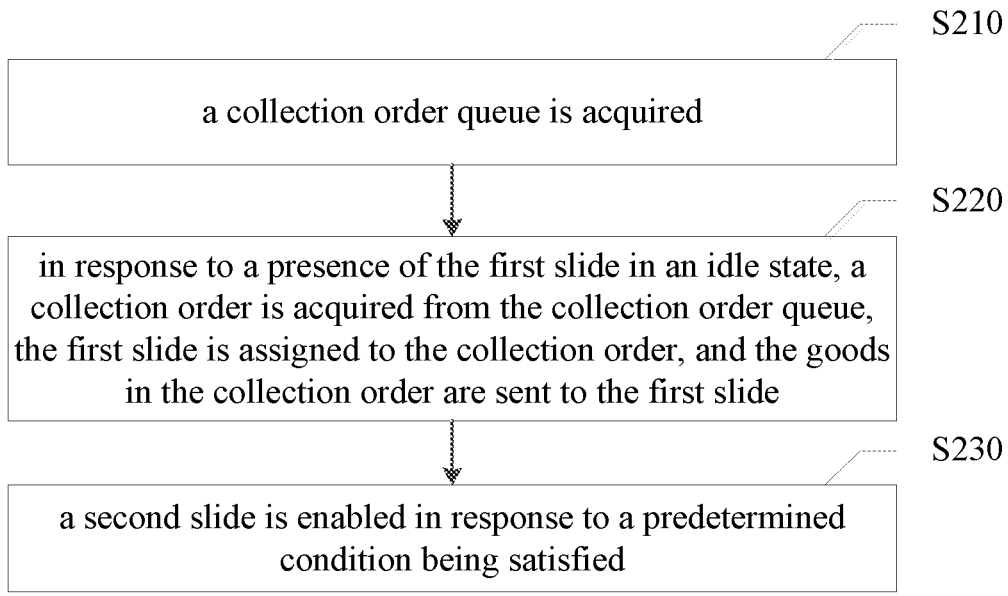
FIG. 2 schematically shows a flowchart of a method of accumulating order-goods according to the embodiments of the present disclosure.

FIG. 2 schematically shows a flowchart of a method of accumulating order-goods according to the embodiments of the present disclosure.

As shown in FIG. 2, the method includes steps S201-S230.

In step S210, a collection order queue is acquired.

According to the embodiments of the present disclosure, before assigning the slides for the goods of each collection order, the collection orders to be assigned with the slides are acquired from the collection order queue. Therefore, after the control system generates the collection orders and delivers the picking tasks, the collection orders of which the picking tasks have been delivered may be determined. In response to all the picking tasks on any one of the collection orders being completed, the collection order is added to the collection order queue and waits for an assignment of the slide.

In step S220, in response to a presence of the first slide in an idle state, a collection order is acquired from the collection order queue, the first slide is assigned to the collection order, and the goods in the collection order are sent to the first slide. The first slide only allows sending of the goods in one collection order at one time.

In step S230, a second slide is activated in response to a predetermined condition being satisfied. The second slide allows simultaneous sending of the goods in a plurality of collection orders. According to the embodiments of the present disclosure, after the goods enter the second slide, the goods at an exit of the second slide may be further separated according to different collection orders or different orders manually or through a robot, to complete a packaging.

According to the embodiments of the present disclosure, the activating a second slide in response to a predetermined condition being satisfied includes: activating the second slide in response to an absence of the first slide in an idle state. In response to the absence of first slide in an idle state, it means that all the first slides have been occupied. The new collection order does not have the first slide for allocation and may only wait for the presence of the first slide in an idle state, which may cause congestion. At this time, the second slide may be activated, so that the corresponding goods waiting in a plurality of collection orders slide out of the second slide to avoid congestion.

According to the embodiments of the present disclosure, the activating the second slide in response to a predetermined condition being satisfied includes: activating the second slide in response to a number of the collection orders in the collection order queue being greater than a predetermined value. In the method of the embodiments of the present disclosure, the second slide is activated only in response to a data of the collection orders waiting in the collection order queue exceeding the predetermined value. This avoids frequent activating of the second slide in response to an increasing in a number of non-sustained orders, which may cause insufficient usage of the function of the first slide and may cause additional processing burden.

According to the embodiments of the present disclosure, roles of the first slide and the second slide may be interchanged. For example, a certain slide originally defined as the first slide may be used as the second slide, alternatively, a certain slide originally defined as the second slide may be used as the first slide. A state indication device may be provided to indicate a current state of each slide. For example, an indicator light may be provided to indicate whether a current slide is in a first slid state or a second slide state.

According to the embodiments of the present disclosure, the method further includes: in response to the goods in one same collection order including goods of a specific type, sending other goods in the collection order to the first slide or the second slide prior to the goods of the specific type.

According to the embodiments of the present disclosure, the goods of the specific type may for example, be identified with a specific mark in a data system. When the goods corresponding to the collection order processed by the control system include the goods with a mark, a special processing may be performed. The goods of the specific type may include, for example, items requiring refrigeration, living things, and the like. The control system may send other goods in the collection order to the slide prior to the goods of the specific type, so that these items may be packaged immediately after they are received at the exit of the slide, and that the production of orders including the goods of the specific type may be completed as soon as possible. In addition, when generating the picking order, the control system may generate picking tasks for the goods of the specific type at last, so that the picking of the collection order is completed immediately after the picking of these orders is completed, and then the accumulation step is directly reached without waiting, which further improves an order production speed of the goods of the specific type.

By activating the second slide which allows a simultaneous usage of the plurality of collection orders, the method avoids a restriction of the entire order processing procedure by the order accumulation step during a high order delivery period, and improves an order processing efficiency.

Figure 3:
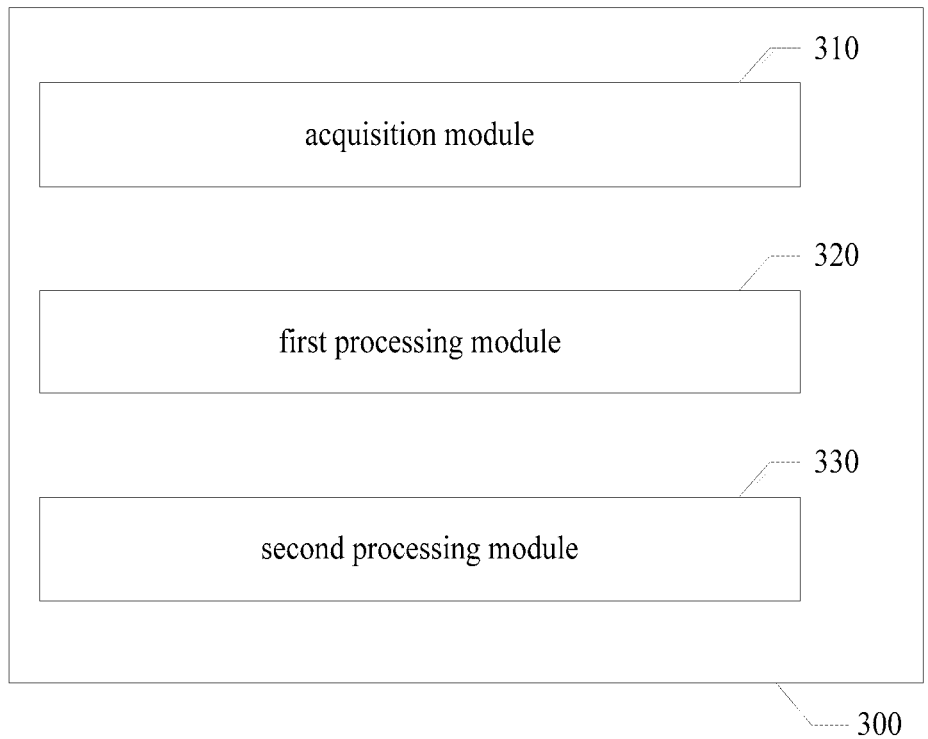
FIG. 3 schematically shows a block diagram of a system of accumulating order-goods according to the embodiments of the present disclosure.

FIG. 3 schematically shows a block diagram of a system 300 of accumulating order-goods according to the embodiments of the present disclosure.

As shown in FIG. 3, the system 300 of accumulating order-goods includes an acquisition module 310, a first processing module 320, and a second processing module 330.

The acquisition module 310, for example, executes the step S210 described above with reference to FIG. 2, to acquire the collection order queue.

The first processing module 320, for example, executes the step S220 described above with reference to FIG. 2, to acquire the collection order from the collection order queue, assign the first slide to the collection order, and send the goods in the collection order to the first slide in response to the presence of the first slide in an idle state. The first slide only allows sending of the goods in one collection order at one time.

The second processing module 330, for example, executes the step S230 described above with reference to FIG. 2, to activate the second slide in response to a predetermined condition being satisfied. The second slide allows simultaneous sending of the goods in a plurality of collection orders.

According to the embodiments of the present disclosure, the activating the second slide in response to a predetermined condition being satisfied includes: activating the second slide in response to the absence of the first slide in an idle state.

According to the embodiments of the present disclosure, the activating the second slide in response to a predetermined condition being satisfied includes: activating the second slide in response to the number of collection orders in the collection order queue being greater than a predetermined value.

According to the embodiments of the present disclosure, the system further includes an adjustment module configured to, in response to the goods in one same collection order including goods of a specific type, send other goods in the collection order to the first slide or the second slide prior to the goods of the specific type.

Any two or more of modules, sub modules, units and sub units according to the embodiments of the present disclosure, or at least part of the functions thereof may be implemented in one module. Any one or more of the modules, sub modules, units and sub units according to the embodiments of the present disclosure may be separated into a plurality of modules for implementation. Any one or more of the modules, sub modules, units and sub units according to the embodiments of the present disclosure may be implemented at least partially as a hardware circuit, such as a field programmable gate array (FPGA), a programmable logic array (PLA), a system on a chip, a system on a substrate, a system on an encapsulation, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub modules, units and sub units according to the embodiments of the present disclosure may be at least partially implemented as a computer program module which may perform the corresponding functions in response to the computer program module being executed.

For example, any two or more of the acquisition module 310, the first processing module 320, the second processing module 330 and the adjustment module may be integrated into one module for implementation, or any one module thereof may be separated into a plurality of modules. Alternatively, at least part of the functions of one or more of these modules may be combined with at least part of the functions of other modules and implemented in one module. According to the embodiments of the present disclosure, at least one of the acquisition module 310, the first processing module 320, the second processing module 330 and the adjustment module may be implemented at least partially as a hardware circuit, such as a field programmable gate array (FPGA), a programmable logic array (PLA), a system on a chip, a system on a substrate, a system on an encapsulation, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the acquisition module 310, the first processing module 320, the second processing module 330 and the adjustment module may be at least partially implemented as a computer program module which may perform the corresponding functions in response to the computer program module being executed.

Figure 4:
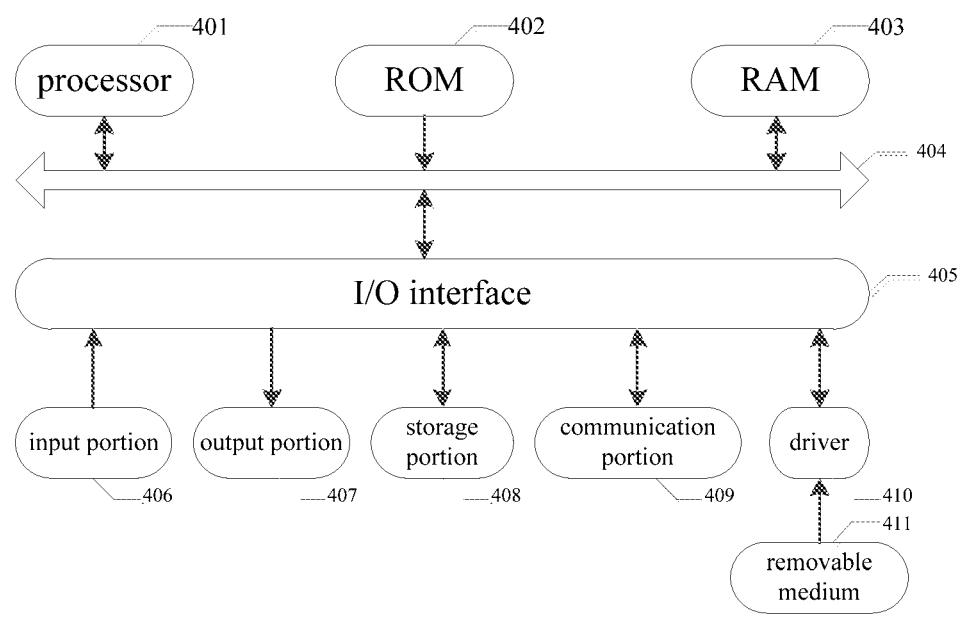
FIG. 4 schematically shows a block diagram of a computer system suitable for a system of accumulating order-goods according to the embodiments of the present disclosure.

FIG. 4 schematically shows a block diagram of a computer system 400 suitable for implementing the method described above according to the embodiments of the present disclosure. The computer system shown in FIG. 4 is merely an example, and should not bring any limitation to the function and scope of usage of the embodiments of the present disclosure.

As shown in FIG. 4, the computer system 400 according to the embodiments of the present disclosure includes a processor 401, which may execute various appropriate actions and processing according to programs stored in a read only memory (ROM) 402 or programs loaded into a random access memory (RAM) 403 from a storage portion 408. The processor 401 may, for example, include a general-purpose microprocessor (for example, CPU), an instruction set processor and/or a related chipset and/or a special-purpose microprocessor (for example, an application specific integrated circuit (ASIC)), and the like. The processor 401 may further include an on-board memory for caching purposes. The processor 401 may include a single processing unit or a plurality of processing units for executing different actions of the method process according to the embodiments of the present disclosure.

Various programs and data required for the operation of the system 400 are stored in the RAM 403. The processor 401, the ROM 402 and the RAM 403 are connected to each other through a bus 404. The processor 401 executes various operations of the method process according to the embodiments of the present disclosure by executing the programs in the ROM 402 and/or the RAM 403. It should be noted that the program may also be stored in one or more memories other than the ROM 402 and the RAM 403. The processor 401 may also execute various operations of the method process according to the embodiments of the present disclosure by executing the programs stored in the one or more memories.

According to the embodiments of the present disclosure, the system 400 may further include an input/output (I/O) interface 405 which is also connected to the bus 404. The system 400 may further include one or more of the following components connected to the I/O interface 405: an input portion 406 including a keyboard, a mouse, etc.; an output portion 407 including a cathode ray tube (CRT), a liquid crystal display (LCD), etc. and a speaker, etc.; a storage portion 408 including a hard disk, etc.; and a communication portion 409 including a network interface card such as a LAN card, a modem, and the like. The communication portion 409 performs communication processing via a network such as the Internet. A driver 410 is also connected to the I/O interface 405 as required. A removable medium 411, such as a magnetic disk, an optical disk, a magneto-optical disk, a semiconductor memory, and the like, is installed on the driver 410 as required, so that it is convenient for the computer program read therefrom to be installed into the storage portion 408 as needed.

The method process according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such embodiments, the computer program may be downloaded and installed from the network through the communication portion 409, and/or installed from the removable medium 411. When the computer program is executed by the processor 401, the above-mentioned functions defined in the system of the embodiments of the present disclosure are performed. According to the embodiments of the present disclosure, the above-described systems, apparatuses, devices, modules, units, etc. may be implemented by computer program modules.

The present disclosure further provides a computer-readable storage medium, which may be included in the apparatus/device/system described in the above embodiments; or may exist alone without being assembled into the apparatus/device/system. The above-mentioned computer-readable storage medium carries one or more programs which perform the method according to the embodiments of the present disclosure when being executed.

According to the embodiments of the present disclosure, the computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage element, magnetic storage element, or any suitable combination of the above. In the present disclosure, the computer-readable storage medium may be any tangible medium that includes or stores programs that may be used by or in combination with an instruction execution system, apparatus, or device. For example, according to the embodiments of the present disclosure, the computer-readable storage medium may include the ROM 402 and/or the RAM 403 described above and/or one or more memories other than the ROM 402 and the RAM 403.

Figure 5:
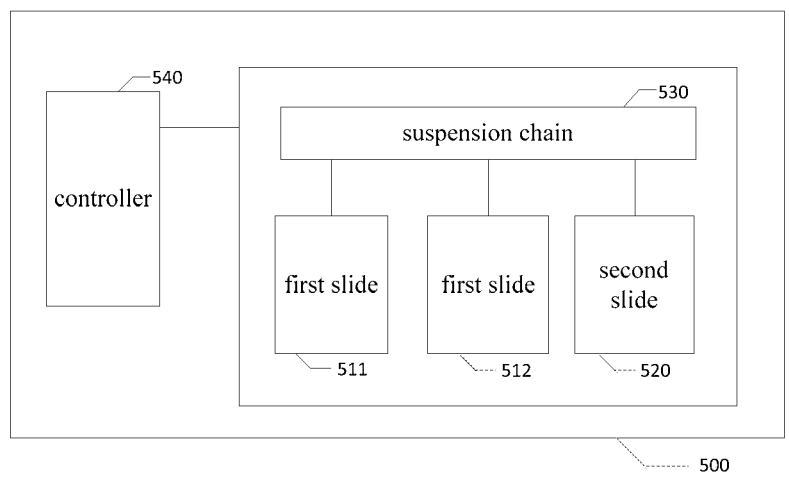
FIG. 5 schematically shows a diagram of a device of accumulating order-goods according to the embodiments of the present disclosure.

FIG. 5 schematically shows a diagram of a device 500 of accumulating order-goods according to the embodiments of the present disclosure.

As shown in FIG. 5, the device 500 of accumulating order-goods includes a plurality of first slides (such as first slides 511, 512), at least one second slide (such as a second slide 520), a suspension chain 530, and a controller 540. The device 500 may implement various methods of the embodiments of the present disclosure described above with reference to FIG. 2.

The first slide only allows sending of the goods in one collection order at one time. The second slide allows simultaneous sending of the goods in a plurality of collection orders. The suspension chain 530 is configured to suspend the goods and send the goods to the first slide or the second slide according to the collection order. The controller 540 is configured to acquire the collection order queue, acquire the collection order from the collection order queue in response to the presence of the first slide in an idle state, assign the first slide to the collection order, send the goods in the collection order to the first slide, and activate the second slide in response to a predetermined condition being satisfied.

According to the embodiments of the present disclosure, the device 500 further includes an indicator light configured to indicate a working state of the first slide or the second slide.

For example, each first slide may correspond to one or a group of indicator lights. Different states of the first slide may be indicated by different states of the indicator lights. The states of the first slide may include, for example, an idle state, a state in which the collection order is being processed, and a state in which the collection order has been processed. For example, the states of the lights may be distinguished by different colors, or may be distinguished by states such as always on, off, and flashing, or may be distinguished by different flashing modes. In response to one first slide corresponding to a plurality of indicator lights, different states may be indicated by different lights.

For another example, each second slide may correspond to one or a group of indicator lights for indicating activated and disabled states of the second slide.

In particular, in some cases, the first slide and the second slide may be allowed to be converted mutually. For example, a certain slide originally defined as the first slide may be used as the second slide, or a certain slide originally defined as the second slide may be used as the first slide. In this case, the indicator light may also be used to indicate whether the current slide is in the first slide state or the second slide state.

The flowcharts and block diagrams in the drawings illustrate possible architecture, functions, and operations of the system, method, and computer program product according to the embodiments of the present disclosure. In this regard, each block in the flowcharts or block diagrams may represent a part of a module, a program segment, or a code, the part of the module, the program segment, or the code includes one or more executable instructions for implementing specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in a reverse order, depending on the functions involved. It should also be noted that each block in the block diagrams or flowcharts, and a combination of blocks in the block diagrams or flowcharts, may be implemented by a dedicated hardware-based system that performs the specified functions or operations, or may be implemented by a combination of dedicated hardware and computer instructions.

Those skilled in the art may understand that the features cited in the various embodiments and/or claims of the present disclosure may be combined and/or incorporated in various ways, even if such combinations or incorporations are not explicitly described in the present disclosure. In particular, without departing from the spirit and teaching of the present disclosure, the features cited in the various embodiments and/or claims of the present disclosure may be combined and/or incorporated in various ways. All these combinations and/or incorporations fall within the scope of the present disclosure.

The embodiments of the present disclosure have been described above. However, these embodiments are for illustrative purposes only, and are not intended to limit the scope of the present disclosure. Although the embodiments have been respectively described above, this does not mean that measures in the respective embodiments may not be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of accumulating order-goods implemented by using a device of accumulating order-goods, the device of accumulating order-goods comprising:
   a plurality of first slides each configured to allow sending of goods in one collection order at one time;
   at least one second slide, wherein the at least one second slide and the plurality of first slides are arranged in parallel, and the at least one second slide is configured to allow simultaneous sending of goods in a plurality of collection orders;
   a suspension chain connected with the plurality of first slides and the at least one second slide, wherein the suspension chain is configured to suspend the goods and send the goods to the plurality of first slides or the second slide according to the collection order; and
   a controller connected with the suspension chain, wherein the controller is configured to acquire a collection order queue, and
   the method of accumulating order-goods comprising:
   acquiring the collection order queue;
   detecting a state of a first slide;
   acquiring a collection order from the collection order queue, assigning the first slide to the collection order, and sending goods in the collection order to the first slide in response to a presence of the first slide in an idle state being detected;
   activating a second slide in response to an absence of the first slide in an idle state being detected and a number of the collection orders in the collection order queue being greater than a predetermined value.

2. The method according to claim 1, further comprising:
   in response to the goods in one same collection order comprising goods of a specific type, sending other goods in the collection order to the first slide or the second slide prior to the goods of the specific type.

3. An electronic apparatus, comprising:
   one or more processors; and
   a memory for storing one or more computer programs,
   wherein in response to the one or more computer programs being executed by the one or more processors, the one or more processors implement the method according to claim 1.

4. A non-transitory computer-readable medium having executable instructions stored thereon, wherein in response to the instructions being executed by a processor, the processor implements the method according to claim 1.

5. A device of accumulating order-goods, comprising:
   a plurality of first slides each configured to allow sending of goods in one collection order at one time;
   at least one second slide, wherein the at least one second slide and the plurality of first slides are arranged in parallel, and the at least one second slide is configured to allow simultaneous sending of goods in a plurality of collection orders;
   a suspension chain connected with the plurality of first slides and the at least one second slide, wherein the suspension chain is configured to suspend the goods and send the goods to the plurality of first slides or the second slide according to the collection order; and
   a controller connected with the suspension chain, wherein the controller is configured to acquire a collection order queue,
   wherein a state of the plurality of first slides is detected,
   in response to a presence of a first slide in an idle state in the plurality of first slides being detected, acquire the collection order from the collection order queue, assign the first slide in the idle state to the collection order, and the controller controls the suspension chain to send the goods in the collection order to the first slide in the idle state, and
   in response to an absence of the first slide in the idle state being detected and a number of the collection orders in the collection order queue being greater than a predetermined value, activate the second slide.

6. The device according to claim 5, further comprising:
   an indicator light configured to indicate working states of the plurality of first slides or a working state of the second slide.

* * * * *